Nov. 8, 1966  W. F. HUCK  3,284,081

SHEET CONVEYING APPARATUS

Filed July 24, 1964  4 Sheets-Sheet 1

INVENTOR
WILLIAM F. HUCK
BY
Albert E. Johnston
ATTORNEY

Nov. 8, 1966 W. F. HUCK 3,284,081
SHEET CONVEYING APPARATUS
Filed July 24, 1964 4 Sheets-Sheet 2
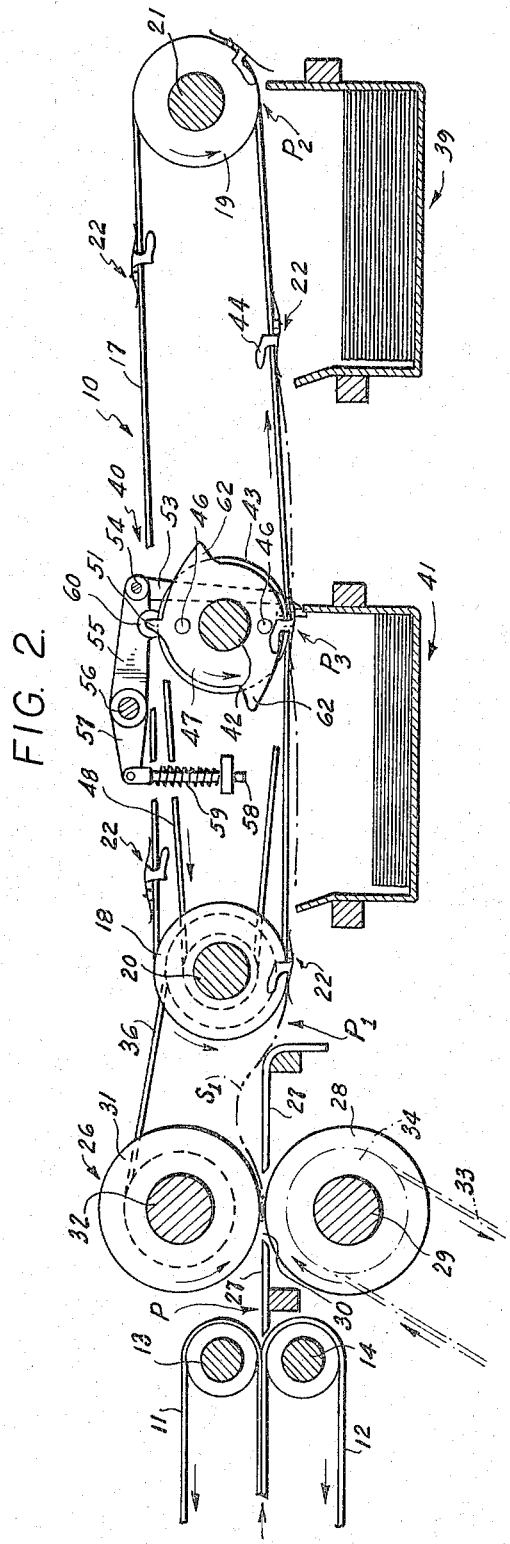
INVENTOR
WILLIAM F. HUCK
BY
Albert C. Johnston
ATTORNEY

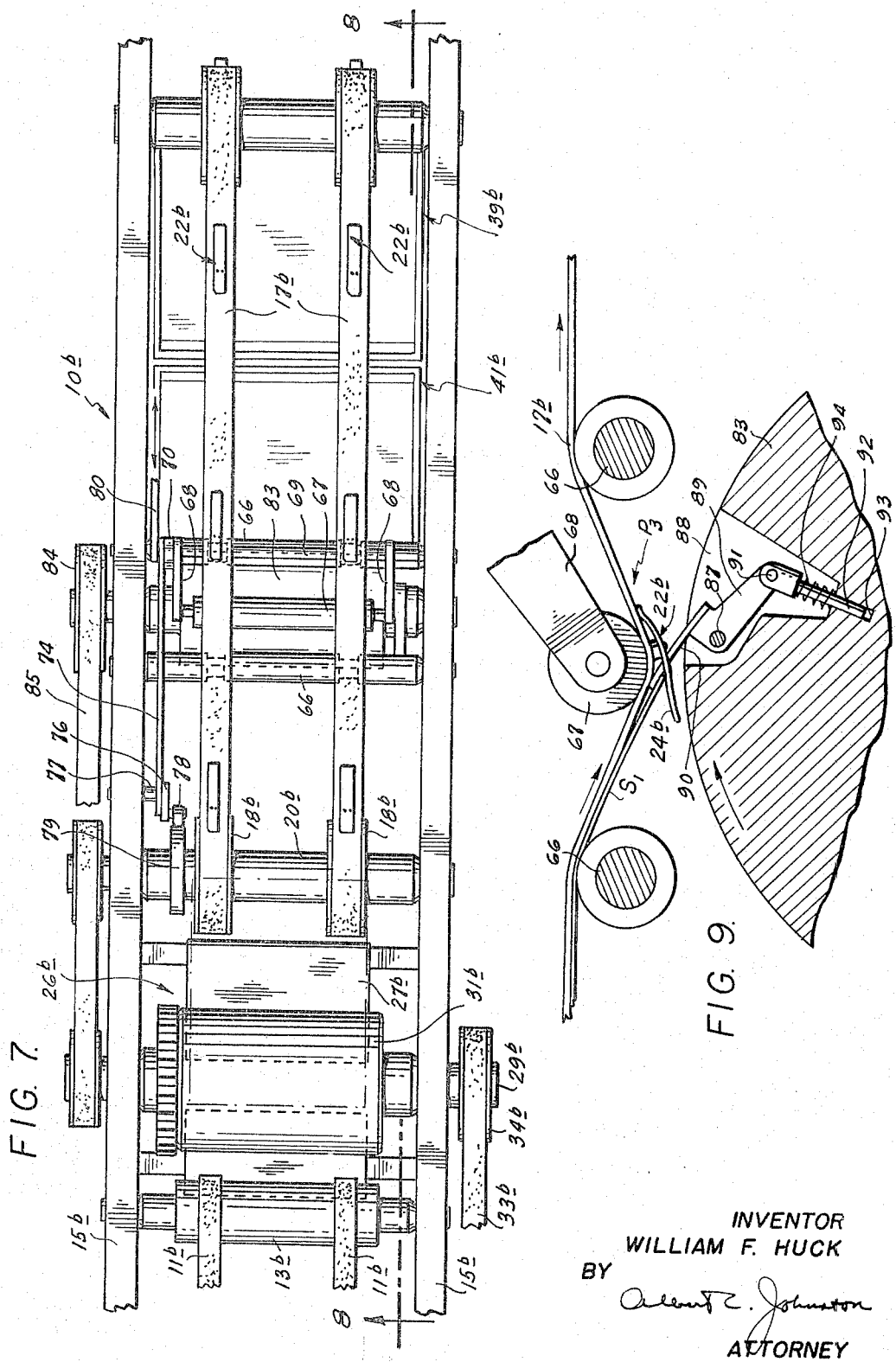

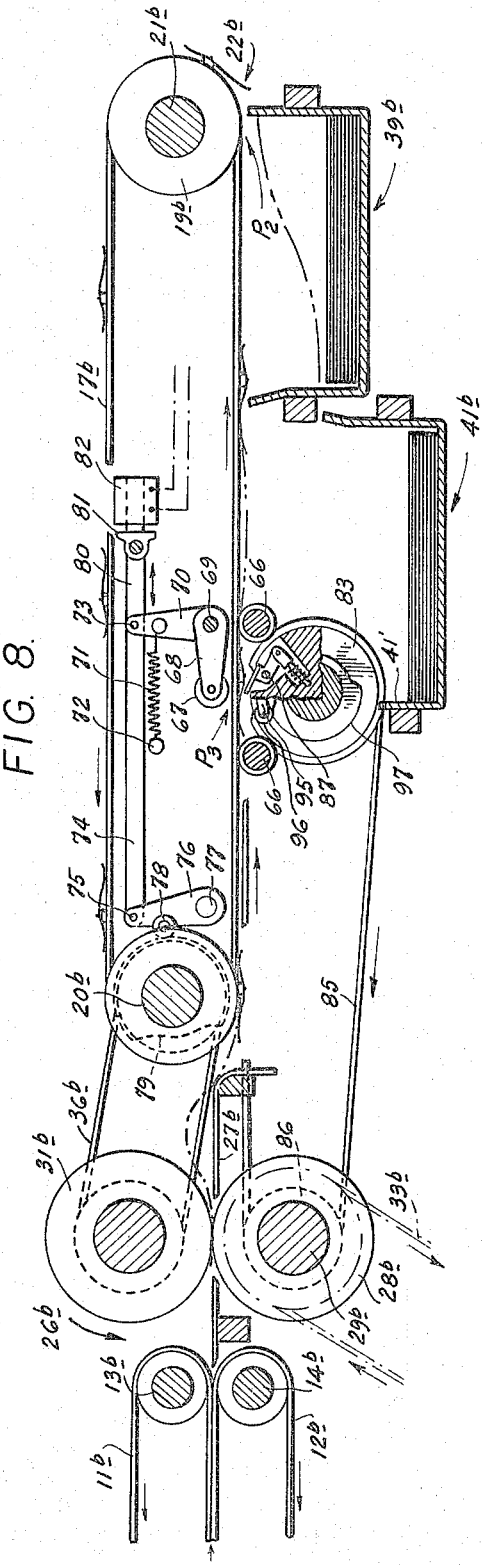
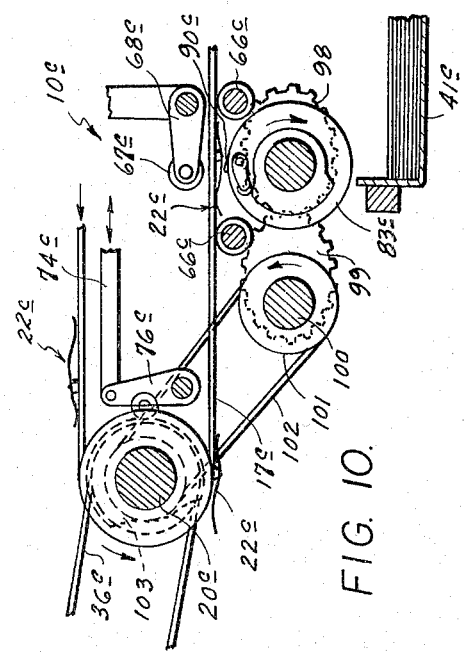

United States Patent Office 3,284,081
Patented Nov. 8, 1966

3,284,081
SHEET CONVEYING APPARATUS
William F. Huck, 81 Greenway Terrace, Forest Hills,
Long Island, N.Y.
Filed July 24, 1964, Ser. No. 384,827
22 Claims. (Cl. 271—64)

This invention relates generally to conveying apparatus, and, more particularly, is directed to improved apparatus for conveying or transporting articles, such as, for example, thin flexible sheets of paper, metal foil, plastics or the like, or signatures of collated and folded sheet or web material from a receiving or take-up position to more or less remote delivery positions.

In my U. S. Letters Patent No. 3,116,924, issued January 7, 1964, there is disclosed sheet conveying apparatus comprising a flexible carrier, for example, in the form of at least one flexible belt, movable along a path that includes portions of relatively large curvature, as defined by a set of pulleys around which the belt runs, and a portion of relatively small curvature therebetween, as defined by a substantially straight run of the belt between the pulleys, an elongated gripping elements extending generally in the direction of movement of the carrier and being secured to spaced parts of the latter of more limited extent in the direction of movement than each gripping element, with each gripping element having at least one free or trailing end portion spaced longitudinally from that part of the carrier to which it is secured and disposed relatively close to the carrier during movement of the gripping element with the carrier or belt along the relatively small curvature portion of the path of travel, such free end portion of each gripping element being angularly displaced away from the adjacent portion of the carrier during the movement of the gripping element with the carrier along the relatively large curvature portions of the path of travel. In a sheet conveying apparatus having the foregoing characteristics, it is only necessary to provide the relatively large curvature portions of the path of travel of the flexible carrier at the sheet take-up or receiving position and at the sheet delivery position, respectively, while the portion of the path of the flexible carrier between those two positions is straight or given a relatively small curvature. In such an arrangement, each gripping element is open, that is, has its free end portion spaced from the adjacent portion of the carrier or belt, at the the take-up position to there receive a sheet or article to be conveyed, for example, from a printing press, and thereafter the gripping element is closed or has its free end portion moved against the carrier to grip the sheet during movement from the take-up position to the delivery position at which the gripping element again opens to release the conveyed sheet and thereby permit collection of the successive conveyed sheets, for example, in a sheet stacking magazine disposed below the delivery position.

The above sheet conveying apparatus is capable of reliable high speed operation in taking up the successive sheets from a press or other source, transporting the successive sheets from the take-up position to the delivery position, and releasing the successive sheets at the delivery position. However, where all of the sheets conveyed at high speed from the take-up position are released at a single delivery position and there permitted to fall successively into a sheet stacking magazine, as in the above identified Letters Patent, the inherently limited speed at which the successive sheets can fall from the delivery position of the conveying apparatus into an underlying magazine acts to restrict the rate at which the sheet conveying apparatus can accept the successive sheets from the printing press or other source.

Accordingly, it is an object of this invention to provide a sheet conveying apparatus of the described character with two or more delivery positions spaced apart along the path of travel of the gripping elements and at which the successive conveyed sheets or other articles are released alternately, or in any other desired sequence, so that the rate at which sheets are released at each delivery position for collection in a related stacking magazine or the like is only a fraction of the rate at which the conveying apparatus accepts or receives sheets at its take-up position; also, so that sheeted products carrying different imprints or other indicia may be separated one from another.

Another object is to provide a sheet conveying apparatus of the described character with means operative to open or release only selected gripping elements as the latter move with the flexible carrier along a portion of the path of the latter which is normally of relatively small curvature, and at which the gripping elements would otherwise be in closed or sheet gripping position.

More specifically, this invention provides improving additions in a sheet conveying apparatus of the type comprising an elongated flexible carrier moving continuously along a path which includes a portion of relatively small curvature preceded and followed, in the direction of movement of the carrier, respectively, by first and second portions of relatively large curvature, a plurality of gripping elements secured to the carrier at parts of the latter spaced along the carrier and each having a free end portion extending longitudinally of the carrier from the part of the latter to which it is secured, the free end portion of each gripping element normally bearing against the carrier during movement along the small curvature portion of the path and being spaced substantially from the carrier during movement along the first and second large curvature portions, sheet feeding means operative to advance a sheet edgewise into the space between the free end portion of each gripping element and the carrier during movement of the element along the first large curvature portion of the path so that a leading edge portion of the sheet is gripped between each gripping element and the carrier as the element enters the small curvature portion of the path, and sheet receiving means located adjacent the second portion of large curvature to receive the conveyed sheets which are there released when the related gripping elements move along the second large curvature portion. In accordance with this invention, the foregoing sheet conveying apparatus is provided with additional sheet receiving means located adjacent the small curvature portion of the path in advance of the first mentioned sheet receiving means, and means operative to effect spacing of the free end portions of only selected gripping elements from the carrier as the selected gripping elements pass the location of the additional sheet receiving means so that the sheets gripped by the selected gripping elements are thereby released for deposit in the additional sheet receiving means and the sheets gripped by the remaining gripping elements are transported beyond the additional sheet receiving means for deposit in the first mentioned sheet receiving means.

In one embodiment of this invention, each of the selected gripping elements has its free or trailing end portion moved or displaced away from the flexible carrier or belt by means exerting a force against such trailing end portion in the direction away from the belt as each selected gripping element passes the location of the additional sheet receiving means, and, at the location where such force is applied to the trailing end portion of each selected gripping element, the flexible carrier or belt preferably is engaged by an idler pulley which deflects the carrier or belt from a straight path so that tension in the carrier or belt provides a component holding the carrier or belt against the surface of the idler pulley while the trailing end portion of the selected gripping element is urged in the opposite direction.

In another embodiment of this invention, the small curvature portion of the path of the flexible carrier or belt is normally substantially straight, and the means operative to effect relative displacement of the free or trailing end portion of each of the selected gripping elements and the belt includes means periodically acting on the carrier or belt at such normally straight portion of its path to temporarily impart relatively large curvature thereto so that a selected gripping element then moving along the path at the location of the temporarily imparted large curvature has its free or trailing end portion angularly displaced away from the carrier or belt for releasing a sheet therebetween.

In accordance with another aspect of this invention, means are provided for slowing the released sheet relative to the carrier or belt when the free or trailing end portion of each selected gripping element is displaced away from the carrier or belt, thereby to positively remove the released sheets from the selected gripping elements and to ensure the deposit of such sheets in the additional sheet receiving means even during high speed operation of the conveying apparatus.

The above, and other objects, features and advantages of this invention, will be apparent in the following detailed description of illustrative embodiments thereof which is to be read in connection with the accompanying drawings forming a part hereof, and wherein:

FIG. 2 is a vertical sectional view taken along the line 2—2 on FIG. 1;

FIG. 5 is an enlarged, fragmentary detail view showing an alternative construction for opening selected gripping elements in a sheet conveying apparatus embodying this invention;

FIG. 6 is a view similar to that of FIG. 5, but showing a gripping element in its open position;

FIG. 7 is a plan view of a sheet conveying apparatus constructed in accordance with another embodiment of this invention;

FIG. 8 is a vertical sectional view taken along the line 8—8 on FIG. 7;

FIG. 9 is an enlarged, fragmentary detail view of a portion of the structure illustrated on FIG. 8, but with the parts thereof disposed for opening of a selected gripping element; and FIG. 10 is a fragmentary sectional view corresponding to a portion of FIG. 8, but illustrating still another embodiment of this invention.

Figure 1:
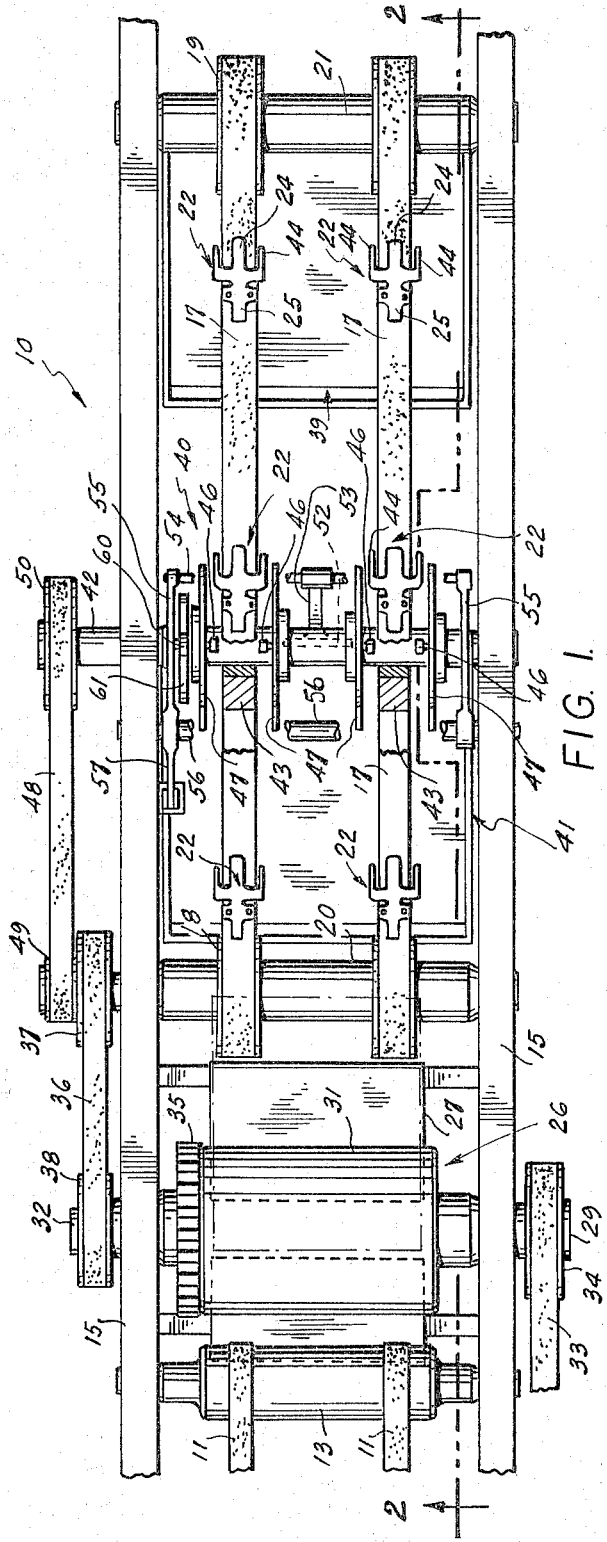
FIG. 1 is a top plan view, partly broken away and in section, of a sheet conveying apparatus embodying this invention.

Referring to the drawings in detail, and initially to FIGS. 1 and 2 thereof, it will be seen that the sheet conveying apparatus there illustrated and generally identified by the reference numeral 10, is employed for transporting successive sheets of paper, metal foil, plastics or the like, or signatures of collated and folded sheet or web material, from a receiving position P. Such receiving position P is located at the delivery ends of cooperating conveyor belts 11 and 12 running around rollers 13 and 14 which are suitably journalled in bearings carried by side frame members 15. Belts 11 and 12 are operative to deliver the sheets in succession to the position P, for example, from a printing press or the like.

The sheet conveying apparatus 10 generally includes a flexible carrier in the form of parallel belts 17 running around pulleys 18 and 19 which are carried by parallel, spaced apart shafts 20 and 21, respectively, having their ends journalled in bearings carried by side frame members 15. The flexible carrier formed by belts 17 is thus guided for movement along a path having portions of relatively large curvature, that is, portions with small radii of curvature, represented by the arcuate surfaces of pulleys 18 and 19 engaged by each belt, and portions of relatively small curvature, that is, portions with large radii of curvature, represented by the substantially straight runs of belts 17 between pulleys 18 and 19.

Equally spaced elongated gripping elements 22 are secured to the outside surface of each belt 17, that is, the surface of the latter which is at the outside of the path of travel of the belt during movement along the relatively large curvature portions of the path of travel of the flexible carrier. The gripping elements 22 extend generally in the direction of movement of the related belts and are located along the latter so as to be transversely aligned with each other, as is apparent on FIG. 1. Each gripping element 22 is fixedly attached, intermediate its opposite ends, as by a clamp 23 (FIGS. 3 and 4), to a part of the related belt 17 having a smaller extent or dimension than the gripping element 22 in the direction of movement of the belt. Thus, each elongated gripping element includes finger-like portions 24 and 25 projecting in opposite directions from the clamp 23 and being free, at their ends, from belt 17. The finger-like portion 24, which trails the related clamp 23 with respect to the direction of movement of belt 17, is preferably longer than the leading finger-like portion 25, and the finger-like portions 24 and 25 of each gripping element 22 are formed so that the free ends thereof bear strongly against the related belt 17 to define the closed condition of the gripping element during movement of the latter with the belt 17 along the relatively small curvature portion of the path of travel, that is, when the gripping element is positioned along the substantially straight run of the belt between pulleys 18 and 19. However, during movement of each gripping element 22 with the belt 17 along the relatively large curvature portions of the path of travel, as defined by the pulleys 18 and 19, the free end of the finger-like portion 24 of each gripping element will be in an opened condition, that is, substantially spaced from the adjacent portion of related belt 17. Thus, even though each gripping element is fixedly attached to the related flexible belt, the trailing end or finger-like portion 24 of each gripping element assumes an open condition at which it is spaced substantially from the belt, or a closed condition, at which the free end of finger-like portion 24 bears strongly against the belt, depending upon the portion of the path of travel of the belt being traversed by the gripping element. It is apparent that, when finger-like portion 24 of each gripping element is in its open condition, the edge of a flexible sheet can be either inserted in, or removed from the generally angular space defined between the belt 17 and finger-like portion 24, whereas, when finger-like portion 24 is in its closed condition, it is adapted to tightly hold or grip the edge portion of a flexible sheet against the adjacent portion of the related belt 17.

In the illustrated sheet conveying apparatus 10, the leading edge portion of a flexible sheet $S_1$ is inserted between the finger-like portion 24 of each gripping element 22 and the adjacent portion of the related belt 17 as the gripping element is in its open condition during travel along the relatively large curvature portion of the path of travel defined by pulley 18, and the leading edge portion of the sheet is gripped between belt 17 and finger-like portion 24 when the gripping element is in its closed condition during travel thereof along the relatively small curvature portion of its path defined by the lower substantially straight run of belt 17 extending from pulley 18 to pulley 19.

Since finger-like portion 24 of each gripping element 22 changes only gradually from its open condition to its closed condition as the gripping element moves from the relatively large curvature portion of the path to the relatively small curvature portion of the path, the sheet conveying apparatus 10 has a sheet feeding mechanism 26 which acts on each sheet $S_1$ delivered by conveyor belts 11 and 12 to the position P and advances the sheet toward the take-up position $P_1$ of gripping elements 22 in a manner to ensure that the leading edge of each sheet is maintained between gripping elements 22 and belts 17 during the gradual change of the gripping elements from the open condition to the closed condition thereof.

The sheet feeding mechanism 26, as shown, may include a table 27 defining a horizontal surface extending from pulleys 13 and 14 to a location adjacent the take-up position $P_1$ of gripping elements 22, that is, slightly above the bottom portions of pulleys 18. A lower sheet feeding roll 28 has stub shafts 29 at its opposite ends journalled in bearings carried by side frame members 15 so that the surface of roll 28 projects, at the top of the latter, through an opening 30 in table 27, and an upper sheet feeding roll 31 disposed above opening 30 has stub shafts 32 extending from its opposite ends journalled in suitable bearings carried by side frame members 15 so that the lower and upper surfaces of each of the successive sheets $S_1$ are simultaneously frictionally engaged by the surfaces of rolls 28 and 31. Rolls 28 and 31 are counter-rotated at rotational speeds that are sufficient to advance each flexible sheet $S_1$ toward the take-up position $P_1$ of gripping elements 22 at a linear speed exceeding the speed of movement of the gripping elements with belts 17. Roll 28 may be driven from a motor (not shown) or from the drive shaft of an associated machine, for example, a printing press delivering the successive sheets to conveyor belts 11 and 12, by means of a drive belt 33 running around a pulley 34 secured on an extension of one of the stub shafts 29 of roll 28, while roll 31 is, in turn, driven from roll 28 at the same peripheral speed as the latter, but in the opposite direction, by means of meshing gears 35 coupled to rolls 28 and 31, at one end thereof. The desired relationship between the peripheral speeds of rolls 28 and 31 and of gripping elements 22 is obtained by driving shaft 20, to which pulleys 18 are secured, by means of a drive belt 36 running around a pulley 37 secured to an extension of shaft 20 and around a pulley 38 fixed to one of the stub shafts 32 of roll 31. If pulleys 37 and 38 are of the same diameter, as shown, rolls 28 and 31 can be given the desired peripheral speed greater than that of the gripping elements 22 merely by forming rolls 28 and 31 with a diameter larger than the diameters of pulleys 18.

The sheet conveying apparatus 10, to the extent described above, generally corresponds to the arrangement disclosed in the previously mentioned U.S. Letters Patent No. 3,116,924, and similarly operates in the following manner:

As a transversely aligned group of gripping elements 22 move along the large curvature portion of the path of travel of belts 17 defined by pulleys 18, with the finger-like portion 24 of each gripping element in its opened condition, a sheet $S_1$ is simultaneously advanced by feeding mechanism 26 toward the end of table 27 adjacent pulleys 18. When the free ends of finger-like portions 24 descend to the level of table 27, that is, to the take-up position $P_1$, the leading edge of sheet $S_1$ reaches the end of table 27 and, during further downward movement of gripping elements 22, the substantially higher linear speed imparted to the sheet $S_1$ by feeding mechanism 26 causes the leading edge of the sheet to be projected into the angular space defined between each opened gripping element 22 and the related belt 17. As each gripping element 22 moves from the large curvature portion of its path of travel onto the small curvature or relatively straight portion of the path defined by the lower run of each belt 17, the gripping element 22 undergoes a smooth and gradual change from its open condition to its closed condition, and the continued relatively high speed advancement of the sheet $S_1$ by feeding mechanism 26 ensures that the leading edge of the sheet will be securely engaged with each gripping element 22 until the latter has attained its fully closed condition. Thereafter, the gripping elements 22 normally remain in closed condition during movement with the related belts 17 along the lower substantially straight run and correspondingly transport the successive gripped sheets. When gripping elements 22 move past a delivery position $P_2$, that is, onto the relatively large curvature portion of the path of travel of belts 17 defined by pulleys 19, the finger-like portion 24 of each gripping element is again angularly displaced away from the adjacent portion of the related belt, that is, displaced to its opened condition. The opening of gripping elements 22 causes release of the leading edge portion of each sheet that has been conveyed or transported by the gripping elements, thereby to permit the released sheet to fall into a sheet receiving means 39 which is shown in the form of a magazine suspended between side frame members 15 below pulleys 19 and adapted to receive the successive flexible sheets in a stack.

In order to ensure the removal from between gripping elements 22 and belts 17 of the leading edge of each flexible sheet which is released by opening of the gripping elements at delivery position $P_2$ in response to movement of the latter around pulleys 19, particularly during high speed operation of the sheet conveying apparatus 10, the latter may further include speed reducing members (not shown) engageable with the leading edge of the released sheet to retard the latter relative to the gripping elements, as fully disclosed in the above mentioned U.S. Letters Patent No. 3,116,924.

The apparatus 10, to the extent described above, has been found to be capable of reliable high speed operation in taking-up the successive sheets from a printing press or other source, in transporting the successive sheets from the take-up position $P_1$ at pulleys 18 to the delivery position $P_2$ at pulleys 19, and in releasing the successive sheets at delivery position $P_2$. However, where all of the sheets are released at a single delivery position, for example, at the position $P_2$, with the intention that the successively released sheets will fall into the underlying sheet stacking magazine 39, the inherently limited speed at which the successively released sheets can fall freely from the single delivery position into the magazine acts to restrict the rate at which the sheet conveying apparatus can accept the successive sheets from a printing press or other source.

In accordance with the present invention, the above limitation or disadvantage of the described sheet conveying apparatus is eliminated by providing the same with at least one additional delivery position $P_3$ disposed at a location along the small curvature portion of the path of travel of the carrier defined by the lower runs of belts 17 in advance of the location of the delivery position $P_2$, and with a mechanism 40 operative to effect spacing from the belts of the trailing end portions 24 of only selected gripping elements 22 as the latter pass the delivery position $P_3$. Thus, sheets gripped by the selected gripping elements 22 are thereby released for deposit in an additional sheet stacking magazine 41 which underlies the delivery position $P_3$, while the sheets gripped by the remaining gripping elements are transported beyond the position $P_3$ and only released at the delivery position $P_2$ for deposit in the previously mentioned magazine 39. Where a plurality of delivery positions are provided, the rate at which the successive sheets are delivered to each of the magazines is only a fraction of the rate at which the sheets are received by the gripping elements 22 at the take-up position $P_1$. For example, where the sheet conveying apparatus 10 is provided with two delivery positions $P_2$ and $P_3$, and the mechanism 40 acts to open alternate gripping elements 22 arranged along each of the belts 17, then half of the conveyed sheets are deposited in the magazine 39 and the other half of the conveyed sheets are deposited in the magazine 41, with the rate at which the successive sheets are deposited in each of the magazines being only one-half the rate at which the conveying apparatus 10 receives successive sheets from a printing press or other source by way of the conveyor belts 11 and 12. By reason of the reduced rate of deposit of the sheets in each magazine, there is an adequate time interval between the sheets released successively for deposit in each magazine so that the successive sheets do not interfere with each other and the magazines can operate in their normal manner to uniformly stack the sheets therein.

In the embodiment of the invention illustrated on FIGS. 1 to 4, inclusive, the release of sheets gripped, at their leading edge portions, by selected gripping elements 22 is effected at the delivery position $P_3$ by applying a downwardly directed force to the trailing end portion 24 of each selected gripping element 22, while the adjacent portion of the related belt 17 is held against downward movement in response to the application of such force. Thus, the applied force effects downward angular displacement of the trailing end portion 24 of the selected gripping element 22 relative to the adjacent portion of the related belt 17 for opening the selected gripping element.

As shown, the mechanism 40 for thus opening the selected gripping elements at delivery position $P_3$ may include a shaft 42 having its opposite end portions journalled in suitable bearings supported by side frame members 15 and being arranged above delivery position $P_3$. An idler pulley 43 for each of the belts 17 is freely rotatable on the shaft 42 and peripherally engages the lower run of the related belt 17 at the location of delivery position $P_3$. Each pulley 43 which is rotated by its frictional engagement with a belt 17 is vertically located, in relation to the pulleys 18 and 19, so as to effect slight downward deflection of the lower run of the belt between the pulleys 18 and 19. By reason of such downward deflection of the lower run of each belt 17, the portions of the lower run extending to and from the location of contact with the periphery of pulley 43 enclose an obtuse angle of less than 180° so that the normal tension in the belt 17 gives rise to a force holding the lower run of the belt upwardly against the periphery of the related pulley 43.

Figure 4:
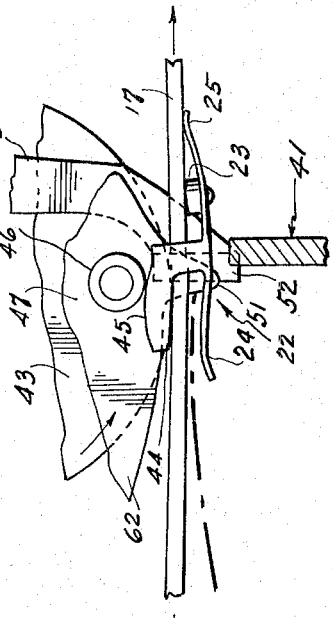
FIG. 4 is a view similar to that of FIG. 3, but illustrating the gripping element in its open position for release of the sheet.
Figure 3:
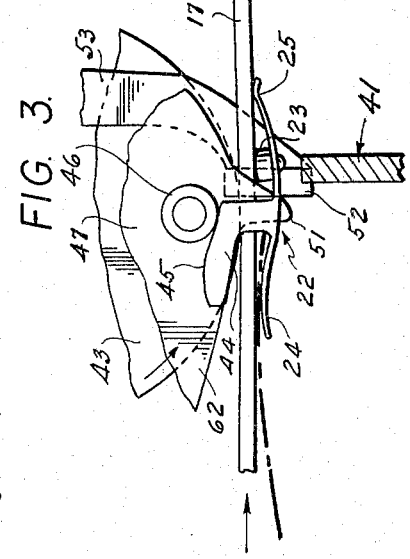
FIG. 3 is an enlarged, fragmentary detail view corresponding to a portion of FIG. 2 and showing a gripping element at the instant before the opening thereof.

As shown particularly on FIGS. 3 and 4, each gripping element 22 has ears or extension 44 projecting from the opposite sides of its trailing end portion 24 and extending inwardly beyond the side edges of the belt 17 to which the gripping element is secured. The ears or extensions 44 have cam-shaped inner edge surfaces 45 which face upward during movement of the related gripping element 22 along the lower run of belt 17 past delivery position $P_3$. Rollers 46 are periodically moved from above into the paths of cam surfaces 45 of the gripping elements 22 passing delivery position $P_3$. As shown particularly on FIG. 1, a pair of disks 47 is provided for each of the belts 17, and the disks 47 of each pair are secured on shaft 42 at the opposite sides of the related idler pulley 43. Each of the disks 47 has one or more, for example, two diametrically opposed rollers 46 mounted thereon so that, as the disks 47 rotate with shaft 42, rollers 46 move along circular paths which, at the bottom thereof, intercept the paths of travel of cam surfaces 45 on the gripping elements moving past delivery position $P_3$.

The shaft 42 is rotated in synchronism with the movement of belts 17 to cause the rollers 46 to move along the bottom portions of their circular paths in the same general direction as the gripping elements 22 moving past delivery position $P_3$, but at a speed slower than the linear speed of movement of the gripping elements. Further, the turning of shaft 42 is timed in relation to the movement of belts 17 so that a roller 46 on each disk 47 is located at the bottom of its circular path of movement upon the arrival of a selected gripping element 22 at the delivery position $P_3$, at which time, initial engagement is effected between each cam surface 45 and a roller 46, as shown on FIGS. 2 and 3. Since the linear speed of movement of each roller 46 is less than the linear speed of movement of the gripping element having its cam surfaces 45 engaged by the rollers, it is apparent that cam surfaces 45 will ride under the rollers 46 engaged therewith, as shown on FIG. 4. The configuration of surfaces 45 is selected to cause gradual and smooth downward displacement of the trailing end portion 24 of each selected gripping element away from the adjacent portion of the related belt 17 as the cam surfaces 45 ride under the engaged rollers 46.

As shown on FIG. 1, shaft 42 may be conveniently driven from shaft 20 by way of a belt 48 running around a pulley 49 secured on shaft 20 and a pulley 50 secured on an extension at one end of shaft 42. In the illustrated embodiment, only alternate gripping elements 22, that is, every other gripping element on each belt 17, are to be opened at delivery position $P_3$, while the remaining gripping elements are allowed to pass that delivery position in closed condition and are only opened upon reaching the delivery position $P_2$, as previously described above. Accordingly, the pulleys 49 and 50 are relatively dimensioned to turn disks 47 through the angular displacement between successive rollers 46 thereon, that is, through 180° in the illustrated example, during the time required for the belts 17 to move through a distance equal to twice the length along each belt between adjacent gripping elements 22 thereon.

In order to ensure that each sheet released from selected gripping elements at delivery position $P_3$ is removed from the gripping elements and deposited in the underlying magazine 41, even during high speed movement of belts 17, the apparatus 10 further preferably includes means for slowing the movement of each released sheet relative to the movement with the belts of the selected gripping elements in open condition at delivery position $P_3$. In the illustrated apparatus 10 such means is in the form of a projection 51 extending from the periphery of each disk 47 in the region of each roller 46 to define a radially directed arresting surface engaged by the leading edge of the sheet as the latter is released by opening of the selected gripping elements at delivery position $P_3$. By reason of the relatively slow rotation of the disk 47, the engagement of the arresting surfaces of the projections 51 with the leading edge of a released sheet serves to slow the speed of movement of the latter relative to the speed of movement of the opened gripping elements with the belt 17. Thus, the released sheet has its leading edge portion removed from between the trailing end portions 24 of the opened gripping elements and the adjacent portions of belts 17.

After a sheet released at delivery position $P_3$ has been slowed relative to the belts, as described above, the sheet is brought to a halt and positively located with respect to the underlying magazine 41 by means of an abutment member 52 suspended by an arm 53 from a cross rod 54. The cross rod 54 is supported, at its opposite ends, by levers 55 which are rockable on a shaft 56 to effect movement of abutment member 52 substantially vertically, that is, generally perpendicular to the plane of the lower runs of belts 17. Thus, abutment member 52 is movable between a lowered or operative position, as shown on FIGS. 2, 3 and 4, where the abutment member extends into the path of travel of the conveyed sheets in advance of the leading edge of a sheet to be released at the delivery position $P_3$, and a raised or inoperative position where the abutment member 52 is located well above the path of the conveyed sheets. In order to urge the abutment member 52 downwardly to its operative position, one of the levers 55 has an arm 57 extending therefrom and pivotally connected to a plunger or rod 58. A compression spring 59 encircles rod 58 (FIG. 2) and yieldably urges levers 55 to rock in the clockwise direction, as viewed on FIG. 2, thereby effecting downward movement of the abutment member. In order to control the movements of abutment member 52 between its operative and inoperative positions in synchronism with the release of sheets from selected gripping elements, one of the levers 55 also carries a cam follower roller 60 which rides on the periphery of a radial cam 61 secured to the shaft 42 for rotation with the latter. The profile of cam 61 is selected so that the abutment member 52 is normally raised to its inoperative position, and is permitted to move downwardly to its operative position for halting the movement of a released sheet only when rollers 46 are positioned for opening selected gripping elements at the delivery position $P_3$.

After a sheet has been released from selected gripping elements 22 and removed from the latter at delivery position $P_3$, as described above, the mechanism 40 further preferably operates to urge the released sheet downwardly into magazine 41 and thereby prevent interference with the next sheet transported by the conveyor belts. That function is performed, in the mechanism 40, by noses 62 (FIG. 2) which extend from the peripheries of disks 47 at locations following the rollers 46, considered in the direction of rotation of the disks. Thus, after rollers 46 have effected the opening of selected gripping elements 22 at delivery position $P_3$, thereby to release the sheet from such selected gripping elements, continued turning of shaft 42 brings the following noses 62 to positions at the bottom of the disks where such noses 62 extend downwardly below the lower runs of belts 17 and thereby urge the released sheet downwardly toward the underlying magazine 41.

FIGS. 5 and 6 illustrate a modified arrangement for opening selected gripping elements 22a during movement of the latter past delivery position $P_3$. In the arrangement of FIGS. 5 and 6, the several parts are identified by the same reference numerals used in connection with the description of the corresponding parts of apparatus 10, but with the letter "a" appended thereto. As shown, the idler pulleys 43a, which are freely rotatable on the shaft 42a and engage the lower runs of the belts 17a at the additional delivery position $P_3$, are provided with toothed peripheries engaging similarly toothed inner surfaces of belts 17a so that the rotational movement of pulleys 43a is positively synchronized with the movement of the belts. Each of the idler pulleys 43a has at least one pin 63 projecting radially therefrom. Each pin 63 is located on each pulley 43a so that, when a selected gripping element 22a arrives at delivery position $P_3$, a pin 63 will be at the bottom of pulley 43a to project downwardly through a suitable opening 64 in the related belt 17a and thereby act downwardly on the trailing end portion 24a of the selected gripping element for downwardly displacing such trailing end portion with respect to the adjacent portion of belt 17a.

Where alternate gripping elements on each belt are to be opened at delivery position $P_3$, the circumference of each pulley 43a, in the case of a pulley having a single pin 63, or the circumferential distance between successive pins 63, in the case of a pulley having two or more of such pins, is made equal to two times the length along each belt 17a between adjacent gripping elements 22a thereon.

In order to ensure that the leading edge portion of a sheet $S_1$ held by the trailing end portions 24a of gripping elements 22a are not affected by the action of the pin or pins 63, each gripping element 22a is preferably formed with ears 65 directed inwardly from the opposite sides of the trailing end portion 24a at a location in trailing relation to the adjacent opening 64 of the belt, so that such ears 65 are engaged by the leading edge of the sheet $S_1$ and thereby limit the insertion of the leading edge portion of the sheet between the gripping elements and belts at the take-up position $P_1$.

It will be understood that the arrangement of FIGS. 5 and 6 merely involves a modification of the means for opening the selected gripping elements at delivery position $P_3$, and that such modified arrangement is preferably employed in connection with the means previously described in connection with the apparatus 10 for slowing and then halting the movement of the released sheet, and for urging the released sheet downwardly into the underlying magazine.

Referring now to FIGS. 7, 8 and 9, it will be seen that the sheet conveying apparatus 10b there illustrated is generally similar to the apparatus 10 previously described herein and that the several parts of the apparatus 10b are identified by the same reference numerals used in describing the corresponding parts of the apparatus 10, but with the letter "b" appended thereto. In the apparatus 10b, the opening of the selected gripping elements 22b at the additional delivery position $P_3$ is effected by periodically acting on the normally straight lower runs of belts 17b to temporarily impart relatively large curvature to the portions of the lower runs at the delivery position $P_3$ so that each of the gripping elements in the transversely aligned group thereof then moving along such portion of large curvature has its trailing end portion 24b angularly displaced away from the related belt 17b for releasing the leading edge portion of the sheet therebetween.

In order to function as above, the apparatus 10b includes two rollers 66 disposed under the lower runs of belts 17b at fixed locations respectively in front and in back of the additional delivery position $P_3$, and such rollers 66 are freely rotatable and have their ends mounted in suitable bearings carried by side frame members 15b. A movable roller 67 is disposed above the lower runs of belts 17b intermediate the locations of rollers 66, that is, approximately at the delivery position $P_3$. Roller 67 is journalled, at its opposite ends, in bearings carried by arms 68 which are secured to a lateral shaft 69 having its ends rotatable in bearings carried by side frame members 15b. An actuating arm 70 is also secured to shaft 69 adjacent one of the side frame members 15b, and a tension spring 71 is connected, at its opposite ends, to arm 70 and to the adjacent side frame member, as at 72 (FIG. 8), thereby to yieldably urge shaft 69 to turn in the counterclockwise direction, as viewed on FIG. 8, for moving roller 67 downwardly against the lower runs of belts 17b between the lower rollers 66.

In order to control the movements of roller 67, arm 70 is further pivotally connected, as at 73, to a link 74 which is, in turn, pivotally connected at 75 with an arm 76 rockable on a pivot 77 extending from the adjacent side frame member 15b at a location near the shaft 20b which carries pulleys 18b. A cam follower roller 78 is rotatably supported by arm 76 and normally engages the periphery of a radial cam 79 secured on the shaft 20b for rotation with the latter. The pivot 73 further serves to connect arm 70 with a link 80 which is, in turn, connected to the armature 81 of a solenoid 82 so that, when solenoid 82 is energized, for example, by closing of a suitable control switch (not shown), the armature 81 is retracted and thereby pulls on link 80 to move roller 78 out of engagement with cam 79 and, simultaneously, to raise roller 67 substantially above the lower runs of belts 17b. However, when solenoid 82 is deenergized, spring 71 acts to maintain engagement of roller 78 with cam 79.

The profile of cam 79 is selected so that roller 67 is normally maintained in its inoperative or raised position shown on FIG. 8, and the roller 67 is moved downwardly between rollers 66 to the position shown on FIG. 9 whenever selected gripping elements 22b which are to be opened arrive at delivery position $P_3$. Such downward movement of roller 67 temporarily imparts a relatively large curvature to each belt 17b in the region of delivery position $P_3$ between the two rollers 66. Each of the gripping elements 22b moving with the related belt 17b along the relatively large curvature defined by the wrap of the belt on the surface of roller 67 has its trailing end portion 24b displaced angularly away from the adjacent portion of the related belt 17b thereby to release the leading edge portion of the sheet $S_1$ therebetween.

In order to remove each released sheet from gripping elements 22b opened at delivery position $P_3$, as described above, the sheet conveying apparatus 10b further includes a take-off cylinder 83 located below the rollers 66 and being journalled, at its ends, in suitable bearings carried by side frame members 15b. A pulley 84 (FIG. 7) is secured to an extension of the journal at one end of take-off cylinder 83 and is driven by a belt 85 which runs around a pulley 86 (shown in broken lines on FIG. 8) secured to a journal 29b of the lower cylinder 28b of sheet feeding mechanism 26b, thereby to effect continuous rotation of take-off cylinder 83 in synchronism with the operation of feeding mechanism 26b and the movement of gripping elements 22b on belt 17b.

As shown particularly on FIG. 9, an axially directed shaft 87 is turnably mounted in cylinder 83 adjacent the surface of the latter to extend through one or more recesses 88. An arm 89 is clamped to shaft 87 within recess 88 and carries gripping fingers 90 which are angularly movable from the open position shown on FIG. 9 to a closed position against the surface of cylinder 83. Arm 89 is pivotally connected, at 91, to the forked end of a rod 92 which is slidable in a radially directed socket 93. A compression spring 94 extends around rod 92 and acts on the forked end of the latter to urge arm 89 to rock in the counter-clockwise direction, as viewed on FIG. 9, that is, for moving fingers 90 to their closed position. Shaft 87 projects at one end from cylinder 83, and such projecting end of shaft 87 has an arm 95 (FIG. 8) secured thereon and carrying a roller 96 which is urged, by the action of spring 94, into engagement with a fixed radial cam 97 suitably supported by the adjacent side frame member 15b.

It will be seen that take-off cylinder 83, being rotated in the clockwise direction, as viewed on FIGS. 8 and 9, has its periphery, at the top of the cylinder, moving in the same general direction as the lower runs of belt 17b. However, the pulleys 84 and 86 of the drive for cylinder 83 are relatively dimensioned so that the peripheral speed of cylinder 83 is substantially less than the linear speed of movement of gripping elements 22b with belts 17b. Further, cam 97 has a profile which is effective to cause gripping fingers 90 to remain open during movement thereof from the bottom of cylinder 83 up to the delivery position $P_3$ at the top of the cylinder and then to close and remain in the closed position during movement of the gripping fingers downwardly from delivery position $P_3$ to the bottom of cylinder 83. It is also to be noted that the drive of cylinder 83 is timed in relation to the movement of gripping elements 22b with belts 17b so that, when selected gripping elements are opened by downward movement of roller 67 for releasing a sheet at the position $P_3$, gripping fingers 90 in their open position are disposed at the top of cylinder 83 to receive the leading edge of the released sheet $S_1$ between the open gripping fingers and the adjacent portion of the surface of cylinder 83, as shown on FIG. 9.

Since the peripheral speed of cylinder 83 is substantially less than the linear speed of movement of gripping elements 22b, the leading edge of the released sheet is securely urged into enagegement with the open gripping fingers 90 and, upon such engagement, the released sheet is slowed relative to the belts 17b by the fingers and thereby has its leading edge portion removed from between the trailing end portions 24b of the opened gripping elements 22b and the adjacent portions of the belts. As gripping fingers 90 move away from the top of cylinder 83 and are closed by the action of cam 97, the leading edge of the removed sheet is clamped or gripped against the surface of cylinder 83 and thereby is transported in a semi-circular path around the cylinder 83 to the bottom of the latter. At the bottom of cylinder 83, gripping fingers 90 are again opened and thereby release the removed sheet for deposit in the additional magazine 41b which is arranged below cylinder 83. The wall 41' of magazine 41b extends close to the surface of cylinder 83 at the bottom of the latter and has notches or recesses for the passage of fingers 90 therethrough. Thus, the top of wall 41' acts as an abutment engageable by the leading edge of the sheet upon opening of fingers 90 at the bottom of cylinder 83 to effect removal of the sheet from the cylinder.

It will be apparent that the successive sheets deposited in magazine 41b are turned over with respect to the positions occupied by such sheets during transport along the lower runs of belts 17b, whereas the sheets deposited in the magazine 39b have the same orientation as during their transport along the lower runs of the belts.

The cam 79 which normally controls the movement of roller 67 between its inoperative and operative positions has its profile arranged so that, in the case of an apparatus having two magazines 39b and 41b, as illustrated, roller 67 is moved downwardly to its operative position only when alternate gripping elements carried by each belt 17b are at the delivery position $P_3$. Thus, half of the conveyed sheets are released from the related gripping elements 22b at the delivery position $P_3$ for deposit in the magazine 41b, while the other half of the sheets engaged by the remaining gripping elements are carried past the delivery position $P_3$ and only released at the position $P_2$ for deposit in the magazine 39b, as previously described with respect to the apparatus 10.

Referring now to FIG. 10, it is to be understood that the sheet conveying apparatus 10c, as there illustrated, is generally the same, in construction and operation, as the apparatus 10b of FIGS. 7, 8 and 9, and differs from the latter apparatus only with respect to the drive by which the take-off cylinder is rotated. The several parts of the apparatus 10c are identified by the same reference numerals used in connection with the description of the corresponding parts of the apparatus 10b, but with the letter "c" appended thereto.

In the apparatus 10c, the cylinder 83c is driven at variable angular velocities so that the cylinder is turning at a relatively high angular velocity effecting movement of its gripping fingers 90c at a peripheral speed only slightly less than that at which the sheet is travelling at the moment of its release by the gripping elements 22c, whereas the angular velocity of the take-off cylinder 83c is very substantially reduced when the gripping fingers 90c thereof arrive at the bottom of the take-off cylinder and are there opened for depositing the sheet in magazine 41c. Such slowdown of the sheet prior to its deposit in magazine 41c may be achieved by driving the take-off cylinder 83c through meshing elliptical gears 98 and 99 which are respectively secured to the take-off cylinder 83c and to an idler shaft 100 which is rotatably supported by the side frame members of apparatus 10c. Also secured on the idler shaft 100 is a pulley 101 driven through a belt 102 from a pulley 103 secured on the shaft 20c and appearing in broken lines on FIG. 10.

In one proposed design of the drive illustrated on FIG. 10, the meshing elliptical gears 98 and 99 have major and minor axes proportioned so that the angular velocity of take-off cylinder 83c, when the gripping fingers of the latter are disposed at the top thereof, is eight times the angular veloctiy of the take-off cylinder when the gripping fingers are at the bottom of the take-off cylinder and opened to deposit a sheet in the magazine 41c. Thus, the sheet is substantially slowed down at the moment of its deposit in magazine 41c.

Although elliptical gears 98 and 99 have been shown and described in the drive for the take-off cylinder of the apparatus 10c, it should be understood that any other conventional type of non-circular gearing would perform the same function, that is, the desirable driving of the take-off cylinder at variable angular velocities.

It is also to be understood that, whereas the modifications of the sheet conveying apparatus embodying this invention have been described and illustrated as having two delivery positions $P_2$ and $P_3$, additional delivery positions can be provided for further segregating the conveyed sheets. In that case, each additional delivery position is provided with mechanisms for opening selected gripping elements and for removing released sheets from the latter, as described hereinabove with respect to the position $P_3$.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention, except as defined in the appended claims.

What is claimed is:

1. A sheet conveying apparatus comprising
an elongated flexible carrier moving continuously along a path which includes a portion of relatively small curvature followed, in the direction of movement of said carrier, by a portion of relatively large curvature;
a plurality of gripping elements secured to said carrier at locations spaced along the latter,
 each gripping element having a closed position in which it grips a sheet to be conveyed and an open position in which its grip on the sheet is released,
 each gripping element being normally in its closed position during movement along said small curvature portion and being in its open position during movement along said large curvature portion;
first sheet receiving means located adjacent and beneath said large curvature portion to receive the conveyed sheets which are released upon opening of the gripping elements at said large curvature portion;
additional sheet receiving means at least at one location adjacent and beneath said small curvature portion in advance of said first sheet receiving means; and
means operative to open selected ones of said gripping elements separated by others of said elements as said selected elements pass said location of the additional sheet receiving means, and to cause the sheet conveyed by each of said selected elements so opened to remain at said location and be deposited downwardly from said path into said additional sheet receiving means.

2. A sheet conveying apparatus as in claim 1;
wherein said additional sheet receiving means is at only one location in advance of said first sheet receiving means, and
said selected gripping elements are alternately arranged along the carrier so that half of the conveyed sheets are released from said alternate gripping elements and sucessively deposited in said additional sheet receiving means and the other half of the conveyed sheets gripped by the remaining gripping elements are conveyed past said additional sheet receiving means for successive deposit in said first sheet receiving means.

3. A sheet conveying apparatus comprising
an elongated flexible carrier moving continously along a path which includes a generally horizontal portion of relatively small curvature followed, in the direction of movement of said carrier, by an upwardly directed portion of relatively large curvature;
 a plurality of gripping elements secured to said carrier at locations spaced along the latter so as to be disposed under said carrier during movement along said horizontal, small curvature portion,
 each gripping element having a closed position in which it grips a sheet to be conveyed and an open position in which its grip on the sheet is released,
 each gripping element being normally in its closed position during movement along said small curvature portion and being in its open position during movement along said large curvature portion;
first sheet receiving means located below said carrier adjacent said large curvature portion to receive the conveyed sheets which are released upon opening of the gripping elements at said large curvature portion;
additional sheet receiving means below said carrier at a location adjacent said small curvature portion in advance of said first sheet receiving means;
means operative to open only selected gripping elements as the latter pass said location of the additional sheet receiving means; and
means slowing the movement of a sheet gripped by each of said selected gripping elements upon opening of the latter at said location, so as to remove the slowed sheet from the selected open gripping element, and directing each removed sheet downwardly into said additional sheet receiving means so that sheets gripped by said selected gripping elements are successively deposited in said additional sheet receiving means and sheets gripped by the other gripping elements are conveyed past said additional sheet receiving means and successively deposited in said first sheet receiving means.

4. A sheet conveying apparatus comprising
at least one set of first and second pulleys rotatable about parallel spaced apart axes;
a flexible belt trained around each set of said first and second pulleys and being continuously driven;
a plurality of gripping elements extending generally longitudinally at the outside surface of said belt and being spaced along the latter,
 each of said gripping elements being fixedly attached to a part of said belt having a substantially smaller longitudinal extent than said element so that the latter has a free end portion trailing said part of the belt to which the element is attached,
 said trailing end portion normally bearing against said belt for gripping therebetween a sheet to be conveyed during movement of the element along the runs of the belt between said pulleys, and said trailing end portion being disposed at an angle to the belt during movement around said pulleys to define an angular pocket between said trailing end portion and said belt and into which a sheet to be conveyed is fed edgewise during movement of said element around said first pulley;
first sheet receiving means disposed adjacent said second pulley to receive sheets released from said gripping elements during movement of the latter around said second pulley;
additional sheet receiving means disposed adjacent the run of said belt moving in the direction from said first pulley toward said second pulley; and
means operative to effect relative angular displacement of the trailing end portions of only selected gripping elements and said belt as said selected elements pass said additional sheet receiving means, thereby to release the sheets gripped by said selected elements for deposit in said additional sheet receiving means so that sheets conveyed by said selected gripping elements are collected in said additional sheet receiving means and sheets conveyed by the remaining gripping elements are collected in said first sheet receiving means.

5. A sheet conveying apparatus as in claim 4;
further comprising an idler pulley engaging the inner surface of said run of said belt near said additional sheet receiving means, said idler pullley being located relative to said first and second pulleys so that the portions of the engaged run extending to and from said idler pulley enclose an obtuse angle, whereby the tension in said belt acts to hold the latter inwardly against said idler pulley; and wherein said means operative to effect relative angular displacement of the trailing end portions of selected gripping elements and the belt includes means exerting an outwardly directed force against said trailing end portion of each selected gripping element as the part of the belt to which said selected gripping element is attached engages said idler pulley and is held inwardly against the latter by said tension in the belt.

6. A sheet conveying apparatus as in claim 5;
wherein at least each of said selected gripping elements has cam-shaped extensions directed inwardly from its trailing end portion; and said means exerting an outwardly directed force includes roller means periodically moved into the path of said cam-shaped extensions of the selected gripping elements as the latter pass said idler pulley.

7. A sheet conveying apparatus as in claim 6;
further comprising a disk rotatable about the axis of said idler pulley and carrying said roller means for movement along a circular path having a portion intercepting said path of the cam-shaped extensions, and means effecting rotation of said disk in synchronism with the movement of said belt to cause said roller means to move along said intercepting portion of its path in the same general direction as said extensions of the gripping element and at a speed slower than the latter, whereby said cam-shaped extensions ride over said roller means.

8. A sheet conveying apparatus as in claim 5;
further comprising a disk rotated about the axis of said idler pulley at a peripheral speed slower than the selected gripping elements,
said disk having a radially directed arresting surface extending therefrom and engageable by the leading edge of sheet released by each selected gripping element, thereby to slow the released sheet relative to the belt for removal from the selected gripping element.

9. A sheet conveying apparatus as in claim 8;
further comprising an abutment member movable generally perpendicular to said run of the belt into and out of the path of travel of the sheets with said gripping elements along said run, and control means for said abutment member operated in synchronism with rotation of said disk to move the abutment member into said path of travel ahead of each sheet released by said selected gripping elements when the movement of the released sheet has been slowed by said arresting surface of the disk.

10. A sheet conveying apparatus as in claim 8; wherein said run of the belt has said outer surface thereof facing generally downwardly and said additional sheet receiving means is located below said run; and
further comprising a nose extending radially outward from said disk and urging each released sheet downwardly into said additional sheet receiving means after the released sheet has been removed from the selected gripping element.

11. A sheet conveying apparatus as in claim 5;
wherein said belt has openings therein at the locations of the trailing end portions of the selected gripping elements, and said means exerting an outwardly directed force includes at least one radial pin projecting from said idler pulley to project outwardly through each of said openings of the belt and act against the trailing end portion of the adjacent selected gripping element.

12. A sheet conveying apparatus as in claim 5;
wherein said run of the belt has its outer surface facing downwardly and said additional sheet receiving means is located below said run; and
further comprising means slowing and then halting the movement of each sheet released from said selected gripping elements for removal from the latter above said additional sheet receiving means, and means urging each removed sheet downwardly into said additional sheet receiving means.

13. A sheet conveying apparatus as in claim 4;
wherein said run of the belt moving from said first pulley toward said second pulley normally follows a substantially straight path; and
wherein said means operative to effect relative angular displacement of the trailing end portions of the selected gripping elements and the belt includes means periodically acting on said run of the belt to temporarily impart relatively large curvature to a portion of said run in the locale of said additional sheet receiving means so that a selected gripping element then moving along said portion of large curvature has its trailing end portion angularly displaced away from the belt for releasing a sheet therebetween.

14. A sheet conveying apparatus as in claim 13;
wherein said means acting on said run of the belt to temporarily impart large curvature thereto includes rollers disposed at the opposite sides of said run of the belt at locations spaced apart along the the belt and being movable relative to each other in directions generally perpendicular to said normal straight path of said run, and actuating means operated in synchronism with the movement of said belt to move at least one of said rollers disposed at one side of said run toward the opposite side of the latter when a selected gripping element is nearing said rollers.

15. A sheet conveying apparatus as in claim 13;
wherein said means acting on said run to temporarily impart large curvature thereto includes two rollers engaging the outside surface of said belt at locations spaced apart along said normally straight run and being rotatable about fixed axes, a movable roller located at the inner side of the belt between said two rollers and being movable in the directions toward and away from the belt, and actuating means operated in synchronism with the movement of said belt to normally hold said movable roller out of contact with the belt and to displace the movable roller outwardly between said two rollers when a selected gripping element is on the portion of the belt located between said two rollers and having a large curvature by reason of its wrap on said movable roller.

16. A sheet conveying apparatus as in claim 13;
further comprising means slowing each released sheet relative to said belt so as to remove the released sheet from the selected gripping element while the trailing end portion of the latter is angularly displaced away from the belt.

17. A sheet conveying apparatus as in claim 16;
wherein said means slowing each released sheet includes a take-off cylinder rotatably mounted between said additional sheet receiving means and said locale where large curvature is temporarily imparted to said run of the belt, drive means rotating said take-off cylinder in synchronism with the movement of said belt so that the surface of the cylinder closest to said locale moves in the same direction as said belt but at a slower speed, gripping fingers on said take-off cylinder movable between open and closed positions, and control means for said gripping fingers opening the latter to receive a released sheet at said locale on the belt and then closing said gripping fingers to clamp the leading edge of the released sheet to said surface of the cylinder until the fingers reach said additional sheet receiving means whereupon said fingers are again opened to deposit the sheet in said additional sheet receiving means.

18. A sheet conveying apparatus as in claim 17;
wherein said drive means for the take-off cylinder includes a train of meshing non-circular gears for effecting rotation of said cylinder at varying angular velocities which are greatest, when said fingers are adjacent said locale on the belt, and smallest, when said fingers are adjacent said additional sheet receiving means so that each sheet released from selected gripping elements is deposited in said additional sheet receiving means while traveling at slow speed.

19. A sheet conveying apparatus comprising
at least one set of first and second pulleys rotatable about parallel, horizontally spaced apart axes;
a flexible belt trained around each set of said first and second pulleys so as to have upper and lower runs and being continuously driven with said lower run moving from said first pulley toward said second pulley;
a plurality of gripping elements extending generally longitudinally at the outside surface of said belt and being spaced along the latter,
   each of said gripping elements being fixedly attached to a part of said belt having a substantially smaller longitudinal extent than said element so that the latter has a free end portion trailing said part of the belt to which the element is attached,
   said trailing end portion normally bearing against said belt for gripping therebetween a sheet to be conveyed during movement of the element along said lower run of the belt, and said trailing end portion being disposed at an angle to the belt during movement around said pulleys to define an angular pocket between said trailing end portion and said belt and into which a sheet to be conveyed is fed edgewise during movement of said element around said first pulley;
first sheet receiving means disposed below said lower run adjacent said second pulley so that sheets released from said gripping elements during movement of the latter around said second pulley fall into said first sheet receiving means;
additional sheet receiving means disposed under said lower run of the belt at a location intermediate said first and second pulleys;
means operative to effect relative angular displacement of the trailing end portions of only selected gripping elements and said belt as said selected elements pass said location of the additional sheet receiving means, thereby to release the sheets gripped by said selected elements; and
means moving the released sheets from said selected gripping elements to permit such released sheets to drop into said additional sheet receiving means so that sheets conveyed by said selected gripping elements are collected in said additional sheet receiving means and sheets conveyed by the remaining gripping elements are collected in said first sheet receiving means.

20. A sheet conveying apparatus as in claim 19;
further comprising an idler pulley engaging said lower run of the belt from above and deflecting said lower run downwardly between said first and second pulleys so that tension in the belt acts to hold said lower run upwardly against said idler pulley; and
wherein said means operative to effect relative angular displacement of the trailing end portions of the selected gripping elements includes means exerting a downward force against said trailing end portion of each selected gripping element as the part of the belt to which the latter is attached engages said idler pulley.

21. A sheet conveying apparatus as in claim 19;
wherein said lower run of the belt normally follows a substantially straight path; and
wherein said means operative to effect relative angular displacement of the trailing end portions of the selected gripping elements and the belt includes means periodically acting on said lower run of the belt to temporarily impart relatively large curvature to a portion of said lower run at the location of said additional sheet receiving means so that a selected gripping element then moving along said portion of large curvature has its trailing end portion angularly displaced away from the belt for releasing a sheet therefrom.

22. A sheet conveying apparatus comprising
an elongated flexible belt moving continuously along a path which includes a portion of relatively small curvature followed, in the direction of movement of said belt, by an upwardly directed portion of relatively large curvature;
a plurality of gripping elements extending generally longitudinally at the surface of the belt which is lowermost during travel along said portion of relatively small curvature and being spaced apart along the belt,
   each of said gripping elements being fixedly attached to a part of said belt having a substantially smaller longitudinal extent than said element so that the latter has a free end portion trailing said part of the belt to which the element is attached,
   said trailing end portion normally bearing against said belt for gripping therebetween a sheet to be conveyed during movement of the element along said portion of relatively small curvature, and said trailing end portion being disposed at an angle to the belt during movement of said element along said portion of large curvature for releasing its grip on the sheet;
first sheet receiving means disposed beneath said portion of large curvature to receive sheets released from said gripping elements during movement of the latter along said portion of large curvature;
additional sheet receiving means disposed beneath said belt at a location adjacent said small curvature portion in advance of said first sheet receiving means; and
means operative to effect relatively angular displacement of the trailing end portions of only selected gripping elements and said belt as said selected elements pass said additional sheet receiving means, thereby to release the sheets gripped by said selected elements for deposit in said additional sheet receiving means so that sheets conveyed by said selected gripping element are collected in said additional sheet receiving means and sheets conveyed by the remaining gripping elements are collected in said first sheet receiving means.

References Cited by the Examiner
UNITED STATES PATENTS

| | | | |
|---|---|---|---|
| 3,109,644 | 11/1963 | Reinartz | 271—68 |
| 3,116,924 | 1/1964 | Huck | 271—68 |
| 3,129,824 | 4/1964 | Levy et al. | 271—68 |

ROBERT B. REEVES, *Primary Examiner.*

STANLEY H. TOLLBERG, *Examiner.*